US012188622B2

(12) United States Patent
Van Bommel et al.

(10) Patent No.: US 12,188,622 B2
(45) Date of Patent: Jan. 7, 2025

(54) LIGHTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/787,987

(22) PCT Filed: Dec. 21, 2020

(86) PCT No.: PCT/EP2020/087434
§ 371 (c)(1),
(2) Date: Jun. 22, 2022

(87) PCT Pub. No.: WO2021/136708
PCT Pub. Date: Jul. 8, 2021

(65) Prior Publication Data

US 2023/0015999 A1 Jan. 19, 2023

(30) Foreign Application Priority Data

Jan. 2, 2020 (EP) .................................... 20150072

(51) Int. Cl.
*F21K 9/232* (2016.01)
*F21Y 103/10* (2016.01)
(Continued)

(52) U.S. Cl.
CPC ............. *F21K 9/232* (2016.08); *H05B 45/10* (2020.01); *H05B 45/20* (2020.01); (Continued)

(58) Field of Classification Search
CPC ...................................................... F21K 9/232
See application file for complete search history.

(56) References Cited

U.S. PATENT DOCUMENTS 7,288,902 B1 * 10/2007 Melanson .......... H05B 45/3725
315/DIG. 4
9,420,644 B1 8/2016 Shum
(Continued)

FOREIGN PATENT DOCUMENTS

CN 208871526 U * 5/2019
WO 2019166273 A1 9/2019
WO 2019197394 A1 10/2019

OTHER PUBLICATIONS

Machine translation of Zhao et al. CN 208871526, published May 17, 2019 (Year: 2019).*

*Primary Examiner* — William N Harris

(57) ABSTRACT

A light emitting device configured to emit light with a total color temperature ($CT_{tot}$), said light emitting device comprising at least one first light emitting diode (LED) filament, and at least one second LED filament, wherein each of the at least one first LED filament and the at least one second LED filament comprises an elongated carrier, and an array of light emitting diodes mounted on said substrate; and a controller for individually controlling said at least first LED filament and said at least one second LED filament, wherein said at least one first LED filament is arranged to emit light of a first color temperature ($CT_1$), said first color temperature being controllable in a first color temperature range, from $CT_1^{low}$ to $CT_1^{high}$, wherein said at least one second LED filament is arranged to emit light of a second color temperature ($CT_2$), said second color temperature being controllable in a second color temperature range, from $CT_2^{low}$ to $CT_2^{high}$, and wherein said controller is configured to control said total color temperature (CTtot) from a first total color temperature ($CT_{tot,1}$) to a second total color temperature ($CT_{tot,2}$) by controlling the first color temperature, and the second color temperature according to a preselected control scheme, such that the difference between (Continued)

the first color temperature and the second color temperature (ΔCT) is not constant during the change of $CT_{tot}$.

13 Claims, 6 Drawing Sheets

(51) Int. Cl.

| | |
|---|---|
| ***F21Y 113/10*** | (2016.01) |
| ***H05B 45/10*** | (2020.01) |
| ***H05B 45/20*** | (2020.01) |
| ***H05B 45/3577*** | (2020.01) |

(52) U.S. Cl.
CPC ...... *H05B 45/3577* (2020.01); *F21Y 2103/10* (2016.08); *F21Y 2113/10* (2016.08)

(56) References Cited

U.S. PATENT DOCUMENTS

| | | | | |
|---|---|---|---|---|
| 2015/0085489 | A1* | 3/2015 | Anderson | F21V 19/003 313/643 |
| 2015/0204487 | A1* | 7/2015 | Scapa | F21V 23/06 362/221 |
| 2018/0328543 | A1 | 11/2018 | Bergmann et al. | |
| 2020/0154545 | A1* | 5/2020 | An | H01L 25/167 |
| 2020/0303356 | A1* | 9/2020 | Li | F21K 9/238 |

* cited by examiner

LIGHTING DEVICE

CROSS-REFERENCE TO PRIOR APPLICATIONS

This application is the U.S. National Phase application under 35 U.S.C. § 371 of International Application No. PCT/EP2020/087434, filed on Dec. 21, 2020, which claims the benefit of European Patent Application No. 20150072.5, filed on Jan. 2, 2020. These applications are hereby incorporated by reference herein.

FIELD OF THE INVENTION

The present invention relates to LED filaments, i.e. linear arrays of LEDs arranged on a carrier substrate, used e.g. in retrofit light bulbs. Specifically, the present invention relates to color controllable LED filaments.

BACKGROUND OF THE INVENTION

Incandescent lamps are rapidly being replaced by LED based lighting solutions. It is nevertheless appreciated and desired by users to have retrofit lamps which have the look of an incandescent bulb. For this purpose, one can simply make use of the infrastructure for producing incandescent lamps based on glass and replace the filament with LEDs emitting white light. One of the concepts is based on LED filaments placed in such a bulb. The appearances of these lamps are highly appreciated as they look highly decorative.

As is well known in the field of lighting, the color temperature of a dimmable incandescent light bulb changes as the bulb is dimmed. However, LEDs typically grow cooler in color temperature as drive current is reduced. Thus simply dimming an LED light source in the same manner as an incandescent bulb renders and unnatural outcome with respect to color temperature variation in comparison to the incandescent bulb. Therefore, it is desired to have a color temperature controllable LED filament with a pleasant appearance, that imitates the color temperature change of the retrofit incandescent bulb when dimmed.

Typically, in color temperature variable lamps where the color temperature of the LED filaments can be adjusted, all the filaments have the same appearance.

One solution to this problem is presented by US20180328543A1, as a lamp that includes an optically transmissive enclosure for emitting an emitted light and a base connected to the enclosure. At least one first LED filament and at least one second LED filament are located in the enclosure. The first LED filament emits light having a first correlated color temperature and the second LED filament emits light having a second correlated color temperature that are combined to generate the emitted light. A controller operates to change the correlated color temperature of the emitted light when the lamp is dimmed. In this document, the two different types of filaments with two different color points are used to allow the lamp to be dimmed and simultaneously change color such that the operation of the lamp can mimic the color change associated with a dimmable incandescent bulb. Dimmed as used herein means that the luminous flux of the light emitted from the lamp is lowered. However, document US20180328543A1 fails to address the disappearance of the pleasant flame-filament look at higher color temperatures.

In WO19197394 A1 a light emitting diode, LED, filament lamp, comprising at least one filament extending over a length, L, along a longitudinal axis, A, wherein the LED filament comprises an array of a plurality of LEDs extending along the longitudinal axis, and an encapsulant at least partially enclosing the plurality of LEDs, wherein the encapsulant comprises a luminescent material, and wherein at least one of the thickness, TL, of the encapsulant along a transverse axis, B, perpendicular to the longitudinal axis, and the concentration, CL, of the luminescent material in the encapsulant, varies over at least a portion of the length, L, of the at least one filament along the longitudinal axis, whereby the color temperature, CTL, of the light emitted from the at least one LED filament varies over the length of the at least one LED filament at least along the portion thereof.

Hence there is a need for alternative solutions which can address the above-mentioned problem.

SUMMARY OF THE INVENTION

It is an object of the present invention to overcome this problem, and to provide an LED filament lighting device, that while maintaining the pleasant appearance of the lighting device, in order to obtain a more durable flame-like appearance similar to incandescent lamps.

This and other objects are achieved by providing a lighting device having the features in the independent claim 1. Preferred embodiments are defined in the dependent claims.

According to a first aspect of the invention, there is provided a light emitting device configured to emit light with a total color temperature, the light emitting device comprising at least one first light emitting diode (LED) filament, and at least one second LED filament, wherein each of the at least one first LED filament and the at least one second LED filament comprises an elongated substrate, and an array of light emitting diodes mounted on the substrate; and a controller for individually controlling the at least first LED filament and the at least one second LED filament. The at least one first LED filament is arranged to emit light of a first color temperature, the first color temperature being controllable in a first color temperature range, from $CT_1^{low}$ to $CT_1^{high}$, wherein the at least one second LED filament is arranged to emit light of a second color temperature, the second color temperature being controllable in a second color temperature range, from $CT_2^{low}$ to $CT_2^{high}$, and wherein the controller is configured to control the total color temperature ($CT_{tot}$) from a first total color temperature ($CT_{tot,1}$) to a second total color temperature ($CT_{tot,2}$) by controlling the first color temperature, and the second color temperature according to a preselected control scheme, such that the difference between the first color temperature and the second color temperature (ΔCT) is not constant during changing $CT_{tot}$ from $CT_{tot,1}$, to $CT_{tot,2}'$, which is also referred to as the change of the total color temperature ($CT_{tot}$).

By "controlling the color temperature" is here intended that the wavelength of the emitted light may be controlled, and may include wavelengths in the color spectrum as well as white light. Each LED filament may be configured to emit one single (homogeneous) color, or several separate (heterogeneous) colors.

In this invention, the non-constant ΔCT is achieved by keeping the second color temperature lower than the first color temperature the majority of times. It may be that-specifically at the end points, namely $CT_{tot,1}$, and $CT_{tot,2}$, the second color temperature is equal to the first color temperature. By keeping the second color temperature lower or at most equal to the first color temperature, the second filament may maintain a flame-like look either constantly, or at the least for a longer duration of time during dimming of the lighting device. Thus, the controller may efficiently control the total color temperature emitted by the LED filament lighting device while providing a more desirable (e.g. flame-like) appearance.

The present invention is further advantageous in that the color temperature of the light emitted from each of the first and second filaments of the lighting device may be controlled according to one or more preselected control schemes, resulting in a versatile manner of controlling the color of the light emitted from the LED filament lighting device.

It is noted that, $CT_1^{low}$ and $CT_2^{low}$, correspond to a starting point of the control scheme with an initial difference of $\Delta CT_{start}$, and summing up to $CT_{tot,1}$. Therefore, $CT_{tot,1}$ and $\Delta CT_{start}$ correspond to the same point in time. Following the same logic, $CT_1^{high}$ and $CT_2^{high}$, correspond to an ending point of the control scheme with a final difference of $\Delta CT_{end}$, and summing up to $CT_{tot,2}$. Therefore, $CT_{tot,2}$ and $\Delta CT_{end}$ correspond to the same point in time.

In one embodiment, the total number of first LED filaments may be greater than the total number of second LED filament. Similar to the embodiment above, this embodiment benefits from reaching high $CT_{tot}$ of the lighting device more easily and at lower intensities.

Alternatively, in another embodiment, the total number of first LED filaments may be smaller than the total number of second LED filaments. This embodiment is advantageous in that it may provide a more "retro" appearance to the LED filament lighting device.

In yet another embodiment, there are an equal number of first and second LED filaments, which may lead to a more homogenous appearance.

According to some embodiments, the difference between $CT_1^{low}$ and $CT_2^{low}$, namely $\Delta CT_{start}$, is preferably less than 500 K, more preferably less than 300 K, most preferably less than 100 K.

According to some embodiments, the difference between $CT_1^{high}$ and $CT_2^{high}$, namely $\Delta CT_{end}$, is preferably less than 500 K, more preferably less than 300 K, most preferably less than 100 K.

According to one embodiment, $CT_1^{low}$ and $CT_2^{1'}$ are preferably in the range from 1800 to 2500 K, more preferably from 2000 to 2400 K, most preferably from 2100 to 2300 K.

It is commonly known that the typical "Edison" style incandescent lamp has a full illumination temperature of about 2700 K, and dims down to a warmer 2200 K at about 10% of full illumination, or even lower. An incandescent candelabra lamp may dim to a warmer 1800 K at about 10% of illumination. Therefore, the above-mentioned ranges for the "low" color temperature of the first and second filaments, guarantee the warm, flam-like appearance of the LED filament lighting device.

According to one embodiment, $CT_1^{high}$ and $CT_2^{high}$ is preferably in the range from 2700 to 4500 K, more preferably from 2900 to 4000 K, most preferably from 3000 to 3500 K.

The first color temperature range may overlap the second color temperature range. This may provide the advantage of better aesthetics as a result of a more homogeneous color temperature of both types of filaments. Otherwise, it may be that due to very different color temperatures, the two different types of filaments will become distinguishable by the naked eye of the user. Alternatively, it may be that the first and second color temperature ranges are the same. In this case, the controlling path of the first color temperature and second color temperature may differ, but the starting points ($CT_1^{low}$ and $CT_2^{low}$) and their ending points ($CT_1^{high}$ and $CT_2^{high}$) may fall onto one another.

According to some embodiments, it may be that at $CT_{tot,1}$, $CT_1^{low}$ is equal to $CT_2^{low}$. This would entail that the first and second LED filaments are controlled such that their initial color temperatures were equal. Additionally, or alternatively, it may be that at $CT_{tot,2}$, $CT_1^{high}$ is equal to $CT_2^{high}$. This would entail that the first and second LED filaments are controlled such that their final color temperatures were equal.

The color temperatures of the first and second LED filaments may be controlled in various ways. For example, the controller can be configured to change the first and second color temperature by controlling all LEDs of each LED filament simultaneously. In other words, all LEDs of a LED filament are controlled to emit light of the same color temperature. This may lead to a uniform control of all the LEDs on a filament. Alternatively, the controller is configured to change the first and second color temperature by controlling LEDs of each LED filament individually. In other words, one subset of the LEDs of a LED filament may emit light of one color temperature, while another subset emits light of another color temperature. This may lead to an LED-specific control.

In one embodiment, for increasing the total color temperature, the preselected control scheme includes in a first stage, increasing the difference in the first and second color temperatures; $\Delta CT$, by increasing the first color temperature, while maintaining or reducing, or slightly increasing the second color temperature, and in a second, subsequent stage, reducing the difference in the first and second color temperatures; $\Delta CT$, by maintaining or reducing, or slightly increasing the first color temperature, while increasing the second color temperature. By solely increasing the first color temperature, the flame-like appearance of the lighting device can be maintained for a longer duration of time, similar to what is expected from a typical incandescent lamp when dimmed. In case the user wishes to increase the intensity further, the color temperature of the second filament may be increased, increasing the total color temperature of the LED filament lighting device, imitating the behavior of incandescent lamps when their intensity is being increased.

For example, the color temperature of the first filaments may be increased from 2000 to 2700 K, while the second filament is maintained at 2000 K, after which the second color temperature is increased to 2700 K.

In this way, the total color temperature of the lighting device is increased while a flame-like look maybe maintained during the transition.

The second stage may preferably be initiated when the first color temperature has been increased by at least 400 K, more preferably by at least 500 K, and most preferably by at least 600 K.

According to one embodiment, the preselected control scheme includes controlling said first color temperature independently of said second color temperature.

In this case, one type of filaments (either first or second) may be completely switched OFF or ON independent of whether the other type is ON or OFF. This will provide the possibility of tuning the total color temperature of the LED filament lighting device within the color temperature range of the filament type that is switched ON. In case the "ON" filament is the first filament, the total color temperature range will be higher, hence cooler. In case the "ON" filament is the second filament, the total color temperature of the lighting device will be lower, hence warmer. In this case, the lighting device, depending on the color temperature range of the second filament, may maintain a flame-like appearance either constantly, or at least for a longer duration.

The LED filaments and the controller maybe comprised in a single device, resulting in a relatively compact color-controllable LED filament lighting device.

One or several such LED filament lighting devices can be incorporated in a retro-fit light bulb, further including a transmissive envelope at least partly surrounding the LED filaments, and a connector for electrically and mechanically connecting said light bulb to a socket.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
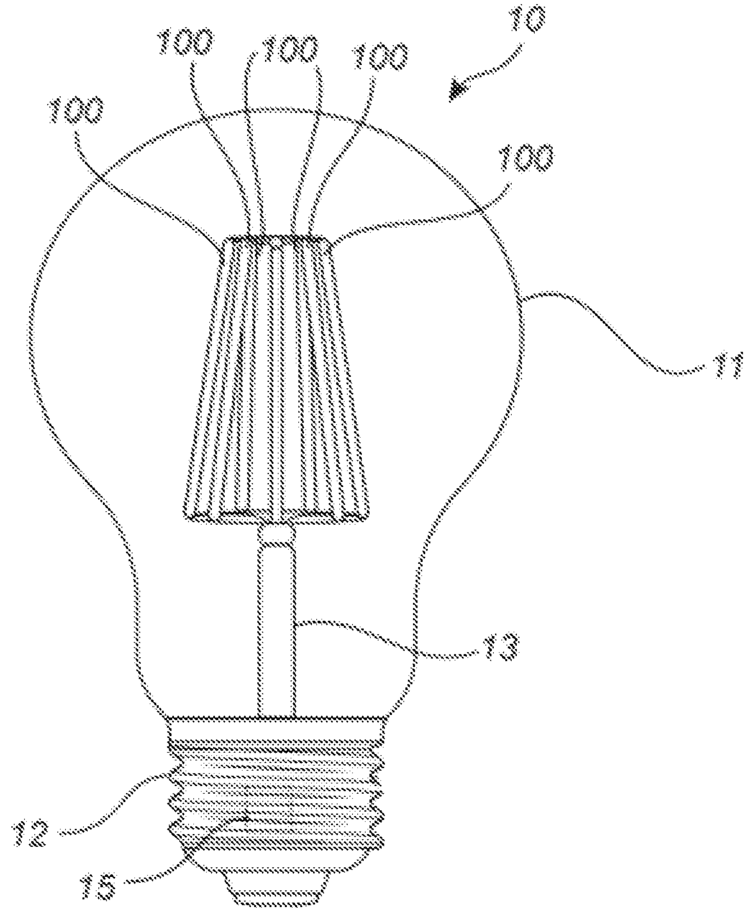
FIG. 1 schematically depicts a retrofit light bulb including a number of LED filaments.

FIG. 1 demonstrates a retrofit light bulb 10 including at least two LED filaments 100 accommodated within an envelope 11. The LED filaments 100 (explained in more detail below) are connected to a controller 15, and the electrical (or mechanical) connector 12, through connecting wires 13. Similar to the typical incandescent light bulbs, here in FIG. 1, the electrical connector 12, here a threaded Edison connector such E26 or E27 in order to connect the lamp 10 to an electric socket (not shown). Note that in this text, retrofit light bulb and lamp are used to refer to the same object, and may be used interchangeably unless noted otherwise.

According to the present invention, the LED lighting device 10, comprises at least one first filament 100*a* (FIG. 4A), arranged to emit light in a first color temperature range ($CT_1^{low}$-$CT_1^{high}$), and at least one second filament 100*b*, arranged to emit light in a second temperature range ($CT_2^{low}$-$CT_2^{high}$). The first and second color temperature ranges may typically be different, such that the first color temperature is higher than the second color temperature. However, it is important to be noted that, the first color temperature range may overlap the second color temperature range. This may provide the advantage of better aesthetics as a result of a more homogeneous color temperature of both types of filaments. Otherwise, it may be that due to very different color temperatures, the two different types of filaments will become distinguishable by the naked eye of the user.

According to at least one embodiment, $CT_1^{low}$ and $CT_2^{low}$ are below 2500 K, preferably below 2400 K, and more preferably below 2300 K, and/or wherein $CT_1^{high}$ and $CT_2^{high}$ is preferably above 2700, more preferably above 2900, most preferably above 3500 K.

It may also be that the color temperatures are in certain ranges, for instance it may be that $CT_1^{low}$ and $CT_2^{low}$ are preferably in the range from 1800 to 2500 K, more preferably from 2000 to 2400 K, most preferably from 2100 to 2300 K. At the higher end of the color temperatures ranges, according to at least one embodiment $CT_1^{high}$ and $CT_2^{high}$ is preferably in the range from 2700 to 4500 K, more preferably from 2900 to 4000 K, most preferably from 3000 to 3500 K.

In the context of this invention, the LED filaments 100 of the lighting device the lamp 10 shown in FIG. 1 can be described as follows. FIG. 2 demonstrates such an LED filament 100. The LEDs 110, are arranged on an elongated carrier 120 for instance a substrate. Please note that in this text the terms "carrier" and "substrate" may be used interchangeably, and unless stated otherwise, are meant to imply the same meaning. Preferably, the LED filament 100 has a length L and a width W, wherein L>5W. The LED filament 100 may be arranged in a straight configuration similar to FIG. 2, or in a non-straight configuration such as for example a curved configuration, a 2D/3D spiral or a helix.

The LED filament 100 may comprise an encapsulant 150 at least partly covering the plurality of LEDs 110. As illustrated in the side view schematics of FIGS. 2*b* and 2*d*, the encapsulant 150 may also at least partly cover at least one of the first major 130 and/or second major surface 140. The encapsulant 150 may be a polymer material which may be flexible such as for example a silicone.

The carrier 120 may be rigid (made from e.g. a polymer, glass, quartz, metal or sapphire) or flexible (e.g. made of a polymer or metal e.g. a film or foil).

A carrier 120 of rigid material may provide better cooling of the LED filament 100, meaning the heat generated by the LED 110 may be distributed by the rigid substrate 120.

A carrier 120 of flexible material may provide shape freedom for designing the aesthetics of the LED filament 100 due to flexibility.

It should be noted that, the thermal management of thin, flexible material (such as foils) may typically be poorer compared to rigid material. However, on the other hand, having rigid material as the substrate 120, may limit the shape design of the LED filament 100.

Figure 2A:
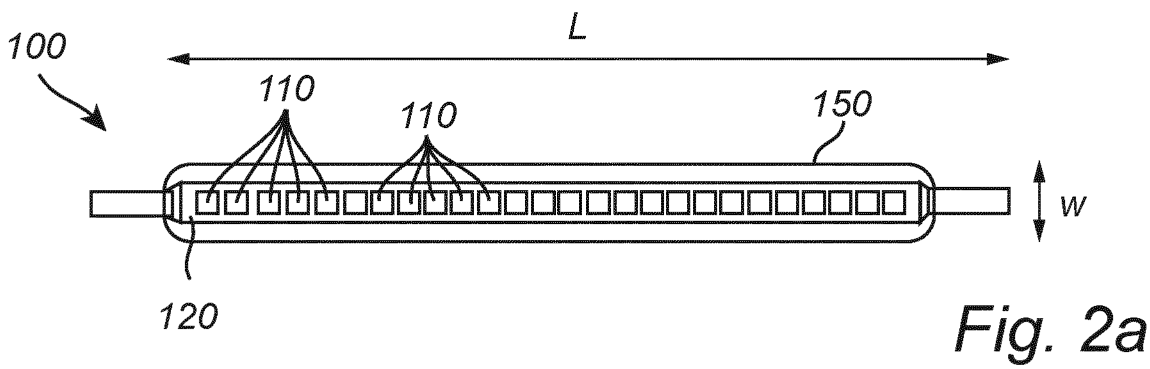
FIG. 2*a* demonstrates a top view of such an LED filament according to at least on embodiment of the invention.
Figure 2B:
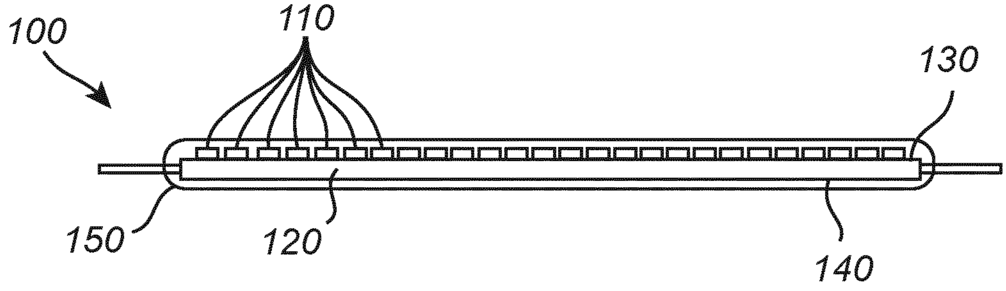
FIGS. 2*b*-2*d* demonstrate side views on LED filaments according to different embodiments of the invention.
Figure 2C:
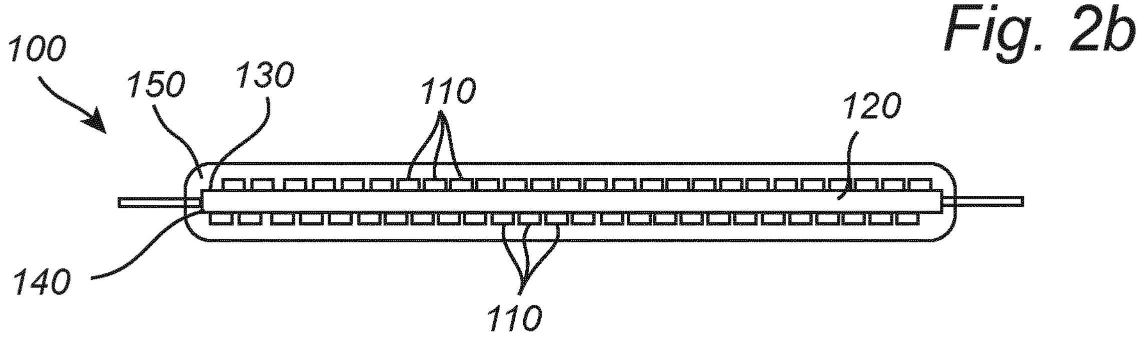
Figure 2D:
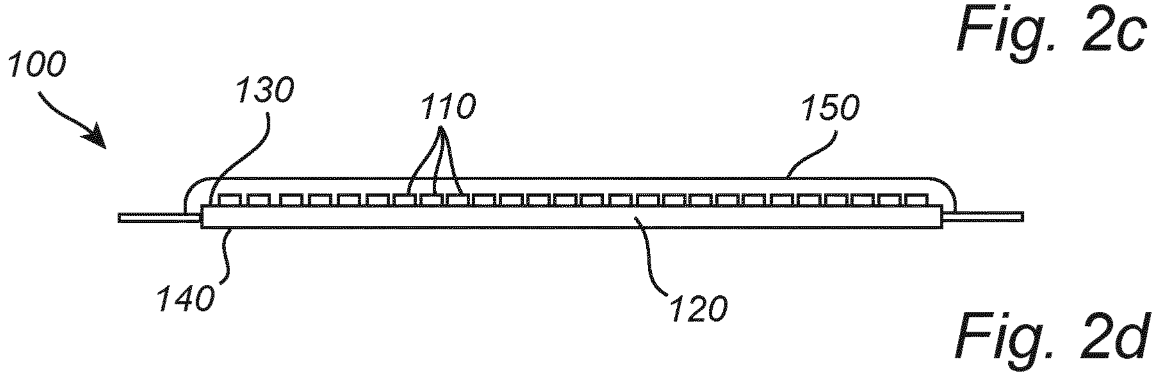

The carrier 120 may comprise a first major surface 130 and an opposite second major surface 140. the LEDs 110 are arranged on at least one of these surfaces (FIGS. 2*a* and 2*c*).

The carrier 120 may be light transmissive, such as translucent, or preferably light transparent. The transmissive substrate may be composed of for example polymer, glass, quartz, etc.

The advantage of a light transmissive substrate may be that the light emitted from the LED 110 may propagate through the substrate 120, leading to a substantially omnidirectional light emission.

For transmissive substrates, the encapsulant 150 may be disposed on both sides of the filament 100.

Alternatively, the carrier 120 may be light reflective. In this embodiment light emitted by the LEDs 110 is reflected off the surface of the substrate on which the LEDs 110 are arranged on (130 and/or 140), thus hindering light from propagating the filament substrate 120.

Further, the LEDs 110 may be arranged for emitting LED light e.g. of different colors or spectrums. The encapsulant 150 may comprise a luminescent material that is configured to at least partly convert LED light into converted light. The luminescent material may be a phosphor such as an inorganic phosphor and/or quantum dots or rods.

Each of the LEDs 110 of the LED filament 100 may emit white light as shown in FIG. 1. The LEDs 110 may emit cool white or warm white light. The LEDs 110 may be blue or UV LEDs covered by an encapsulant 150, such that the encapsulant 150 includes luminescent material, such as phosphor particles. The luminescent material will provide a wavelength conversion of the light from the LEDs 110, and the light emitted from this section will be white light consisting of a mix of blue/UV light and wavelength converted light. The white light may have a color temperature on the black body line.

Figure 3A:
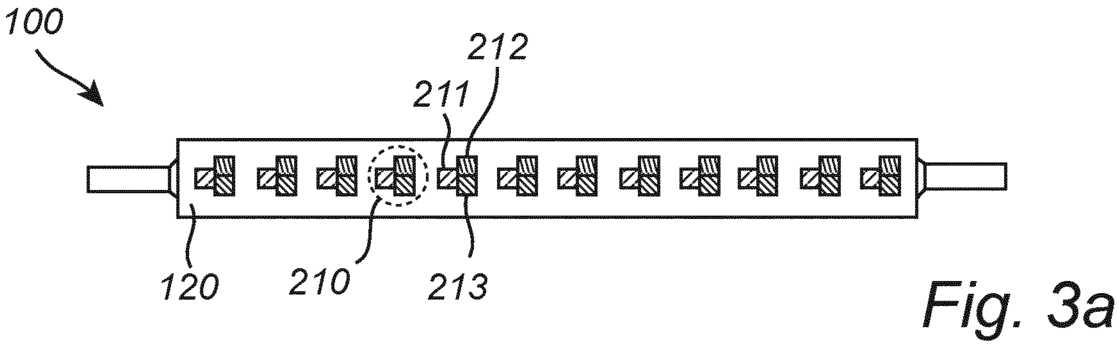
FIGS. 3*a*-3*c* illustrate different embodiments of LED filaments from which color tunable white light is emitted.
Figure 3B:
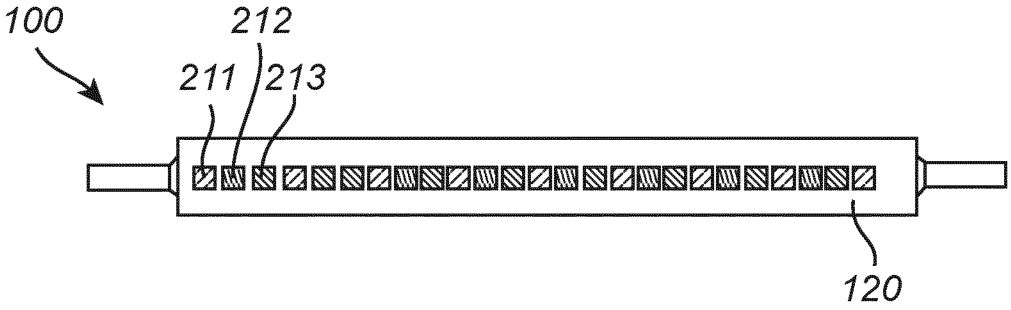

Alternatively, or simultaneously, as demonstrated in FIGS. 3*a* and 3*b*, the LED filament 100 may comprise groups 210 of red (R) 211, green 212 (G), and blue 213 (B) LEDs, wherein light emitted from each of the RGB 211,212, 213 LEDs are combined to produce white light with a cool or warm color temperature. The red 211, green 212, and blue 213 LEDs in each group can be arranged as groups 210 shown in FIG. 3*a*, or disposed one after the other in the longitudinal direction of the LED filament 100 such as illustrated in FIG. 3*b*.

The white light may have an adjustable color temperature. This may be achieved by including at least two different types of LEDs, e.g. red 211 and blue 213 LEDs. By controlling the relative intensity of each type of LED, the color temperature of the emitted light can be controlled.

Figure 3C:
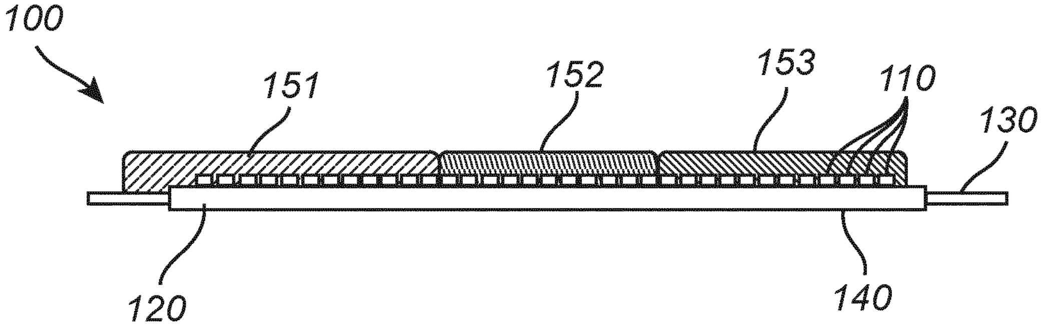

FIG. 3*c* illustrates another approach for obtaining color temperature adjustability. In this embodiment the LED filament 100 may comprise only one type of LEDs (e.g. blue LEDs 213), and instead have different areas covered by different types of encapsulant 151, 152, 153, etc. Again, by controlling the relative intensity of LEDs 110 associated with different encapsulant 151, 152, 153 etc., the color temperature of the emitted light can be controlled.

The color controllable LEDs may include a plurality of LED groups 210 each including a red LED 211, a green LED 212, and a blue LED 213.

The LED filament 100 may comprise multiple sub-filaments.

Figure 4A:
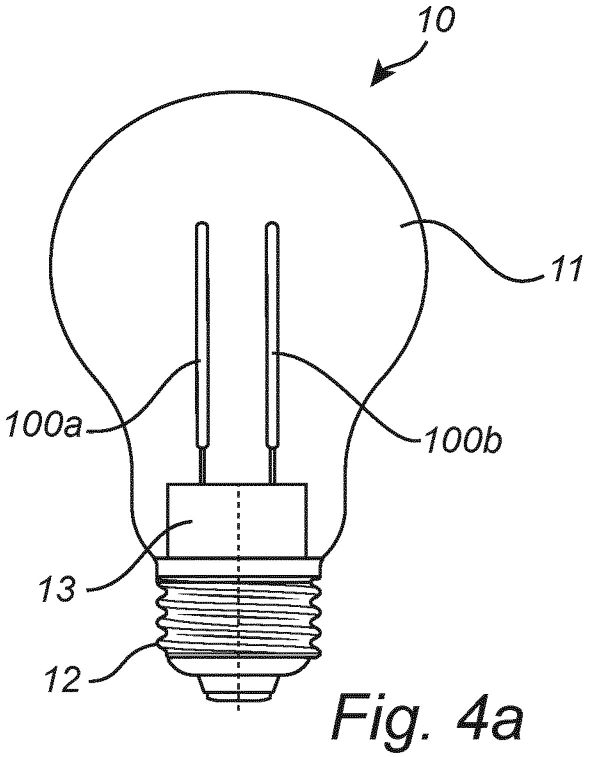
FIG. 4*a* depicts a retrofit lightbulb containing two LED filaments, one with a first color temperature tunability range, and the other with a second color temperature tunability range.

FIG. 4*a* demonstrates one embodiment of the lamp 10, comprising two LED filaments 100*a* and 100*b*, which each are arranged to emit light in a first and second color temperature, respectively.

The total number of the LED filaments; sum of both first 100*a* and second filaments 100*b*, in the LED filament lighting device 10, is preferably more than two, more preferably more than four, most preferably more than five such as six or eight.

In various embodiments, the total number of first LED filaments 100*a* may be greater than, less than, or equal to the total number of second LED filament 100*b*.

Figure 4B:
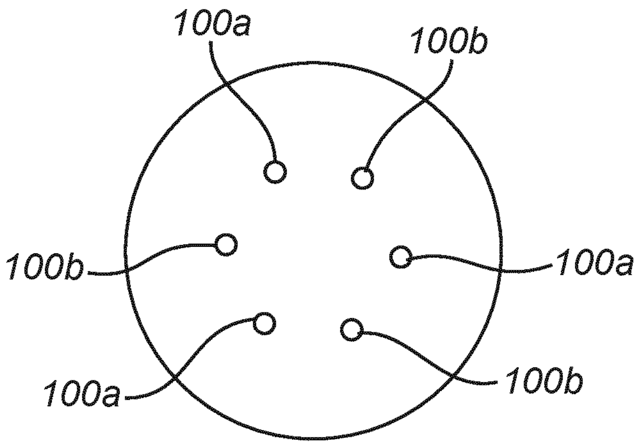
FIG. 4*b* shows a top view cross sectional view of a retrofit lightbulb containing three LED filaments with a first color temperature tunability range, and three LED filaments with a second color temperature tunability range, giving a total number of six LED filaments.

FIG. 4*b* demonstrates the top view of an embodiment of the invention in which the number of first LED filaments 100*a* are equal to the number of second LED filaments 100*b*, and equal to three.

Figure 5A:
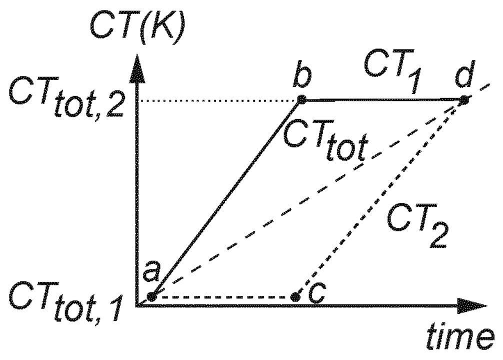
FIGS. 5*a*, 5*b*, 5*c* and 5*d* show illustrative plots of different preselected control schemes for increasing the total color temperature of the light emitting device.
Figure 5B:
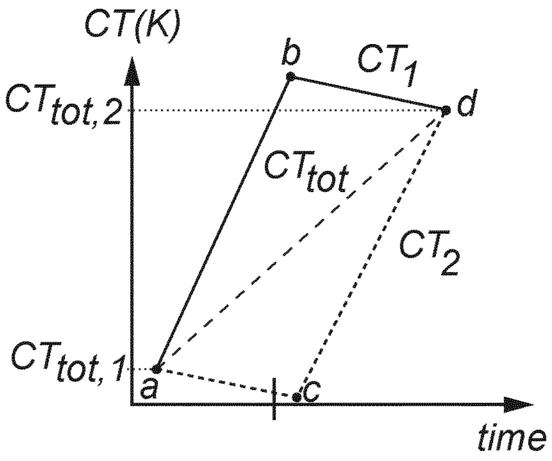
Figure 5C:
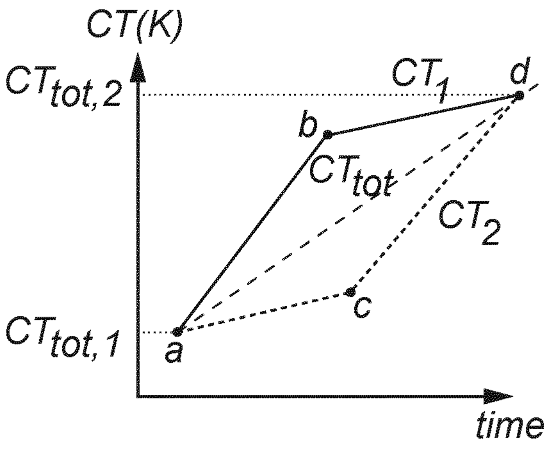

According to aspects of the present invention, for increasing the total color temperature, the controller 15 of the light emitting device 10 operates on a preselected control scheme. FIGS. 5*a*, 5*b* and 5*c* schematically demonstrate the steps of a preselected control scheme as plots of the color temperature versus time, while FIG. 6 shows a flow chart describing the stages of the preselected control scheme.

Figure 6:
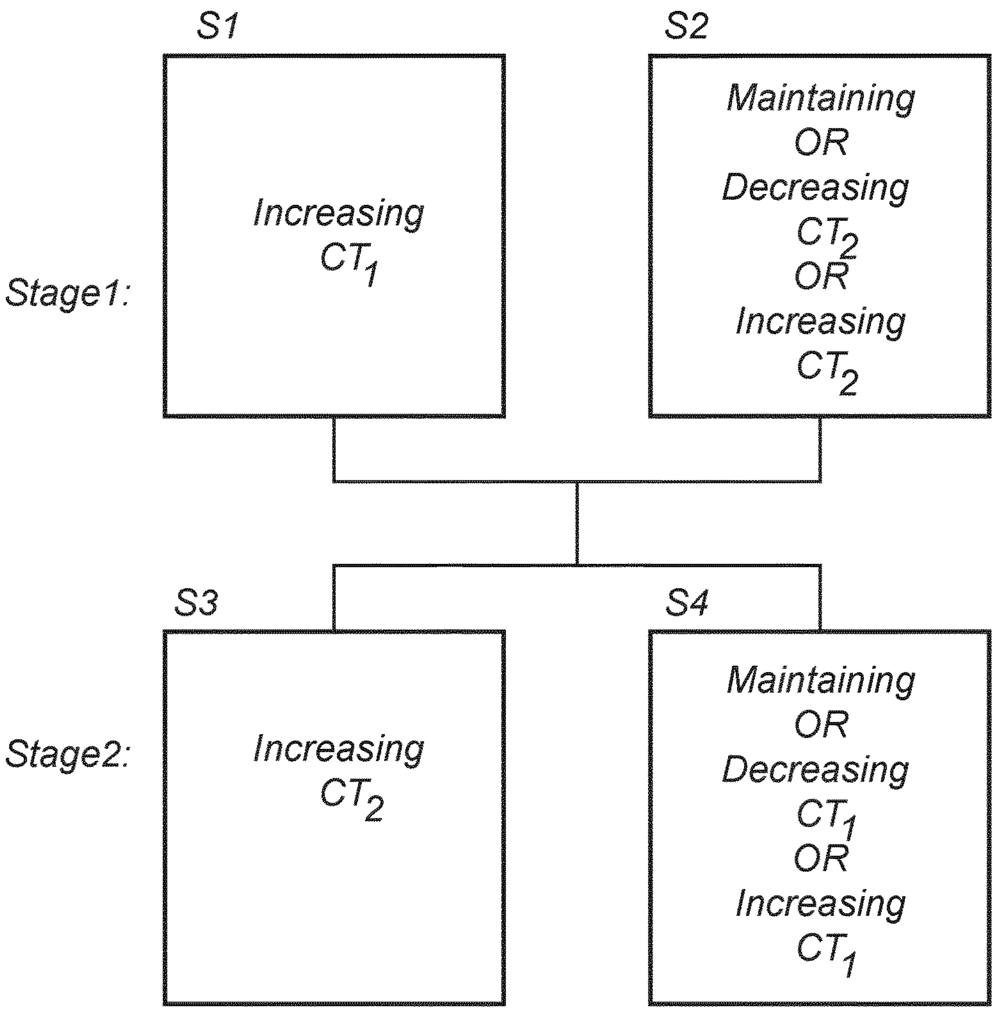
FIG. 6 demonstrates a flow chart describing the stages of the preselected control scheme.

Depicted in FIG. 5*a*, in a first stage, the controller 15 increases the color temperature of the filament(s) 100*a* from a to b, while maintaining the color temperature of the filament(s) 100*b* at a, demonstrated respectively as steps S1, and S2 of FIG. 6. In a second, subsequent stage, increasing the color temperature of the filament(s) 100*b* from c to d, while maintaining the color temperature of the filament(s) 100*a* at b, demonstrated as respectively as steps S3 and S4 in FIG. 6.

FIG. 5*b* shows another preselected control scheme that is slightly different from that demonstrated in FIG. 5*a*. Here, in a first stage, the color temperature of the filament(s) 100*a* is increased from a to b, while the color temperature of the filament(s) 100*b* is reduced from a to c. Again, this stage of FIG. 5*b* respectively corresponds with steps S1 and S2 of the flow chart in FIG. 6. In a second, subsequent stage, the color temperature of the filament(s) 100*b* is increased, while the color temperature of the filament(s) 100*a* is reduced from b to d. This stage of FIG. 5*b* corresponds with steps S3 and S4 of FIG. 6.

FIG. 5*c* shows another alternative for the preselected control scheme. Here, in a first stage, the color temperature of the filament(s) 100*a* is increased from a to b, while the color temperature of the filament(s) 100*b* is slightly increased from a to c. Again, this stage of FIG. 5*b* respectively corresponds with steps S1 and S2 of the flow chart in FIG. 6. In a second, subsequent stage, the color temperature of the filament(s) 100*b* is increased, while the color temperature of the filament(s) 100*a* is slightly increased from b to d. This stage of FIG. 5*b* corresponds with steps S3 and S4 of FIG. 6. It should be noted that, with the word "slightly increased", it is meant to imply that the second color temperature in stage 1, and the first color temperature in stage 2, is increased less than the first color temperature, and the second color temperature, respectively.

It may be such that points b and c coincide in time (as demonstrated in the graph of FIG. 5*a*). This would mean that in FIG. 6, the steps S1 and S2 would coincide precisely in time, and steps S3 and S4 start simultaneously. Alternatively, the stage of increasing the color temperature of the filament(s) 100*b* (step S3 in FIG. 6) may be advanced or delayed in time with respect to the point in time when the color temperature of the filament(s) 100*a* reaches its maximum (point b). According to the latter alternative, this would translate to steps S3 and S4 starting at different points in time. FIG. 5*b* demonstrates a control scheme wherein increasing the color temperature of the filament(s) 100*b* is delayed in time with respect to point b. In other words, in the latter embodiment of the control scheme, step S3 of FIG. 6 is delayed with respect to step S4.

Figure 5D:
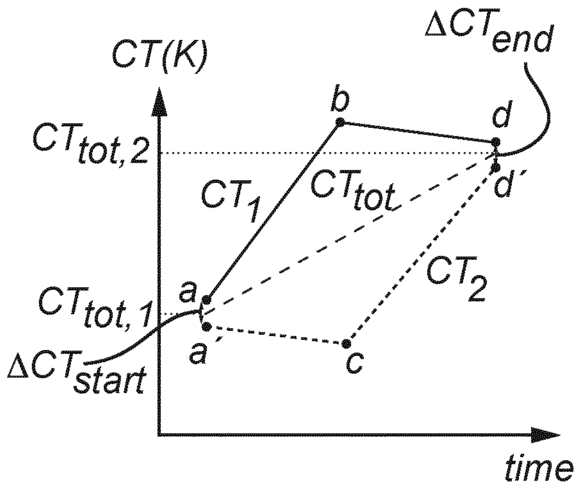

FIG. 5*d*, shows a similar preselected control scheme demonstrated in FIG. 5*b*, in which in the first stage, the color temperature of the filament(s) 100*a* is increased from a to b, while the color temperature of the filament(s) 100*b* is reduced from a to c, and in a second, subsequent stage, the color temperature of the filament(s) 100*b* is increased, while the color temperature of the filament(s) 100*a* is reduced from b to d. However, in the graph of FIG. 5*d*, $CT_1^{low}$ and $CT_2^{low}$ do not overlap, leading to a $\Delta CT_{start}$ that is larger than zero. Similarly, $CT_1^{high}$ and $CT_2^{high}$ do not overlap, leading to a $\Delta CT_{end}$ that is larger than zero. Preferably the differences between $CT_1^{low}$ and $CT_2^{low}$ ($\Delta CT_{start}$), and the difference between $CT_1^{high}$ and $CT_2^{high}$ ($\Delta CT_{end}$), are less than 500 K, more preferably less than 300 K, most preferably less than 100 K. In alternative preselected control schemes different combinations of FIGS. 5*a*, 5*b*, 5*c*, and 5*d*, and or other variations may occur.

It is preferable that the second stage of the preselected control scheme be carried out after the first color temperature is increased at least 400K, more preferably 500K, most preferably 600K. According t the graphs of FIGS. 5*a* through 5*d* this would translate to "a–b>400K, or a–b>500K, or a–b>600K".

Figure 7:
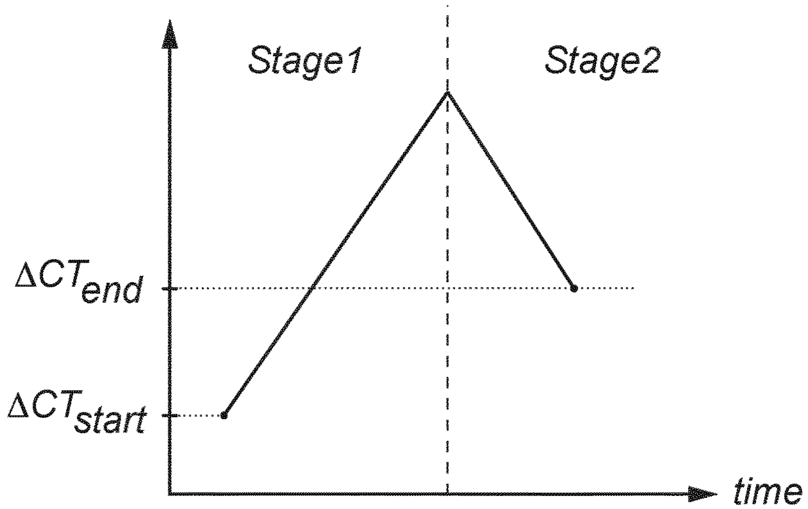
FIG. 7 depicts a graph of the change in the difference of the first and second color temperatures (ΔCT) with respect to time.

FIG. 7 depicts a graph of the change in the difference of the first and second color temperatures (ΔCT) with respect to time. It can be seen that, ΔCT is not constant, and changes with time. In the first stage of the preselected control scheme—described in steps 1 and 2 of FIG. 6, ΔCT increases with time. However, when the second stage is initiated-described in steps 3 and 4 of FIG. 6—ΔCT decreases with time. In the graph of FIG. 7, it is observed that, $\Delta CT_{start}$ and $\Delta CT_{end}$ do not correspond to the same value, and $\Delta CT_{start}$ is larger than $\Delta CT_{end}$. However, in alternative embodiments, it may be that $\Delta CT_{start}$ is higher, or alternatively equal to $\Delta CT_{end}$. If $\Delta CT_{start}$ and/or $\Delta CT_{end}$ are not equal to zero, then $CT_1^{low}$ and $CT_2^{low}$ and/or $CT_1^{high}$ and $CT_2^{high}$ do not overlap, meaning that in the graphs of FIG. 5, at point a and/or point d of the preselected control scheme $CT_1^{low}$ is not equal to $CT_2^{low}$, and/or $CT_1^{high}$ is not equal to $CT_2^{high}$. The embodiment corresponding to the graph of FIG. 7 therefore, corresponds to the preselected control scheme of FIG. 5*d*. Alternatively, if $\Delta CT_{start}$ and/or $\Delta CT_{end}$ are zero, then $\Delta CT_{start}$ and/or $\Delta CT_{end}$ are not equal to zero, then $CT_1^{low}$ and $CT_2^{low}$ and/or $CT_1^{high}$ and $CT_2^{high}$ do not overlap. Embodiments where both $CT_1^{low}$ and $CT_2^{low}$, and $CT_1^{high}$ and $CT_2^{high}$ are overlapping correspond to the preselected control schemes demonstrated in FIGS. 5*a* through 5*c*. It may also be that the slope of the plot in stages 1 and 2 have an equal absolute value. In this case, stage 1 and stage 2 of the preselected control scheme are carried out at equal rates. Alternatively, it may be that the slopes differ in their absolute value. In this case, the rate at which stages 1 and 2 are carried out will differ.

The person skilled in the art realizes that the present invention by no means is limited to the preferred embodiments described above. On the contrary, many modifications and variations are possible within the scope of the appended claims. For example, the number of LED filaments and their detailed arrangement may be different than those shown herein.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device configured to emit light with a total color temperature, $CT_{tot}$, said light emitting device comprising:

at least one first light emitting diode (LED) filament, and at least one second LED filament, wherein each of the at least one first LED filament and the at least one second LED filament comprises an elongated carrier, and an array of light emitting diodes mounted on said carrier, wherein the array of light emitting diodes (LEDs) includes a plurality of groups of LEDs, wherein each group includes at least two different color LEDs, wherein the different color LEDs include red LEDs, blue LEDs and green LEDs; and a controller for individually controlling said at least one first LED filament and said at least one second LED filament, wherein said at least one first LED filament is arranged to emit light of a homogeneous color having a first color temperature, $CT_1$, said first color temperature being controllable in a first color temperature range, from $CT_1^{low}$ to $CT_1^{high}$, wherein said at least one second LED filament is arranged to emit light of a homogeneous color having a second color temperature, $CT_2$, said second color temperature being controllable in a second color temperature range, from $CT_2^{low}$ to $CT_2^{high}$, and wherein said controller is configured to change the first and second color temperature by controlling all LEDs of each LED filament, such that all LEDs of a LED filament emit light of the same color temperature therewith controlling said total color temperature, $CT_{tot}$, from a first total color temperature, $CT_{tot,1}$, to a second total color temperature, $CT_{tot,2}$, by independently controlling the first color temperature and the second color temperature according to a preselected control scheme to produce a flame-like appearance of the light emitting device by independently controlling a relative intensity of each LED filament, by controlling a relative intensity of each color LED in the plurality of groups of the array of LEDs in the respective LED filaments, such that a difference between the first color temperature and the second color temperature, ΔCT, is not constant during changing $CT_{tot}$ from $CT_{tot,1}$, to $CT_{tot,2}$, wherein the control scheme includes a first stage increasing the difference in the first and second color temperatures, ΔCT, by increasing the first color temperature, while maintaining or reducing, or slightly increasing the second color temperature, and in a second, subsequent stage, reducing the difference in the first and second color temperatures, ΔCT, by maintaining or reducing, or slightly increasing the first color temperature, while increasing the second color temperature.

2. The light emitting device according to claim 1, wherein $CT_1^{low}$ and $CT_2^{low}$ are below 2500 K, and/or wherein $CT_1^{high}$ and $CT_2^{high}$ are above 2700.

3. The light emitting device according to claim 1, wherein said first color temperature range and said second color temperature range overlap.

4. The light emitting device according to claim 3, wherein, for said first total color temperature ($CT_{tot,1}$), the first color temperature ($CT_1$) is equal to said second color temperature ($CT_2$).

5. The light emitting device according to claim 3, wherein said first color temperature range and said second color temperature range coincide.

6. The light emitting device according to claim 1, wherein for increasing the total color temperature said preselected control scheme includes:

in a first stage, increasing said difference (ΔCT), and in a second, subsequent stage, reducing said difference (ΔCT).

7. The light emitting device according to claim 6, wherein said second stage is initiated when the color temperature of said at least one first filament has been increased by at least 400.

8. The light emitting device according to claim 1, wherein a total number of first LED filaments is greater than the total number of second LED filaments.

9. The light emitting device according to claim 1, wherein a total number of first LED filaments is smaller than the total number of second LED filaments.

10. The light emitting device according to claim 1, wherein the LEDs of said first and second LED filaments are configured to emit white light.

11. A retrofit light bulb, comprising at least one light emitting device according to claim 1, a transmissive envelope at least partly surrounding said at least one first LED filament and said at least one second LED filament, and a connector for electrically and mechanically connecting said light bulb to a socket.

12. A method for controlling a light emitting device, comprising at least one first LED filament and at least one second LED filament, wherein each of the at least one first LED filament and the at least one second LED filament comprises an elongated carrier, and an array of light emitting diodes mounted on said carrier, wherein the array of light emitting diodes (LEDs) includes a plurality of groups of LEDs, wherein each group includes at least two different color LEDs, wherein the different color LEDs include at least one red LED, at least one blue LED, and at least one green LED, configured to emit light with a total color temperature ($CT_{tot}$), comprising:

controlling a first color temperature of the at least one first LED filament, and a second color temperature of the at least one second LED filament, by controlling a relative intensity of each color LED in the plurality of groups of the array of LEDs in the respective LED filaments, thereby controlling the total color temperature to reach a preset value, wherein said controlling is performed according to a preselected control scheme to produce a flame-like appearance of the light emitting device by independently controlling a relative intensity of each color LED on the at least first and at least second filament, such that a difference between the first color temperature and the second color temperature is not constant during changing the total color temperature, wherein the control scheme includes a first stage increasing the difference in the first and second color temperatures, ΔCT, by increasing the first color temperature, while maintaining or reducing, or slightly increasing the second color temperature, and in a second, subsequent stage, reducing the difference in the first and second color temperatures, ΔCT, by maintaining or reducing, or slightly increasing the first color temperature, while increasing the second color temperature.

13. A light emitting device configured to emit light with a total color temperature, $CT_{tot}$, said light emitting device comprising:

at least one first light emitting diode (LED) filament, and at least one second LED filament, wherein each of the at least one first LED filament and the at least one second LED filament comprises an elongated carrier, and an array of light emitting diodes mounted on said carrier, wherein the array of light emitting diodes (LEDs) of the respective LED filaments each include groups of LEDs with different encapsulants; and a controller for individually controlling said at least one first LED filament and said at least one second LED filament, wherein said at least one first LED filament is arranged to emit light of a homogeneous color having a first color temperature, $CT_1$, said first color temperature being controllable in a first color temperature range, from $CT_1^{low}$ to $CT_1^{high}$, wherein said at least one second LED filament is arranged to emit light of a homogeneous color having a second color temperature, $CT_2$, said second color temperature being controllable in a second color temperature range, from $CT_2^{low}$ to $CT_2^{high}$, and wherein said controller is configured to change the first and second color temperature by controlling all LEDs of each LED filament, such that all LEDs of a LED filament emit light of the same color temperature therewith controlling said total color temperature, $CT_{tot}$, from a first total color temperature, $CT_{tot,1}$, to a second total color temperature, $CT_{tot,2}$, by independently controlling the first color temperature and the second color temperature according to a preselected control scheme to produce a flame-like appearance of the light emitting device by independently controlling a relative intensity of each LED filament, by controlling a relative intensity of each group of LEDs with different encapsulants of a respective first or second LED filament, such that a difference between the first color temperature and the second color temperature, ΔCT, is not constant during changing $CT_{tot}$ from $CT_{tot,1}$, to $CT_{tot,2}$, wherein the control scheme includes a first stage increasing the difference in the first and second color temperatures, ΔCT, by increasing the first color temperature, while maintaining or reducing, or slightly increasing the second color temperature, and in a second, subsequent stage, reducing the difference in the first and second color temperatures, ΔCT, by maintaining or reducing, or slightly increasing the first color temperature, while increasing the second color temperature.

* * * * *